United States Patent
Bonola (10) Patent No.: US 6,178,473 B1
(45) Date of Patent: Jan. 23, 2001

(54) SYSTEM FOR SELECTIVELY INCREMENTING A COUNT NUMBER OF AN ASSOCIATED NODE ONLY WHEN THE NODE IS PUT IN USE IN CONJUNCTION WITH A SUCCESSFUL COMPARE AND SWAP OPERATION

(75) Inventor: Thomas J. Bonola, Tomball, TX (US)

(73) Assignee: Compaq Computer Corporation, Houston, TX (US)

( * ) Notice: Under 35 U.S.C. 154(b), the term of this patent shall be extended for 0 days.

(21) Appl. No.: 09/173,438

(22) Filed: Oct. 15, 1998

(51) Int. Cl.[7] .................................................... G06F 13/10
(52) U.S. Cl. .............................. 710/54; 710/56; 711/148; 712/202; 712/228
(58) Field of Search ........................ 710/52, 56; 711/148; 712/202, 228

(56) References Cited

U.S. PATENT DOCUMENTS

| | | | |
|---|---|---|---|
| 4,584,640 | * 4/1986 | MacGregor et al. | 707/200 |
| 5,265,245 | * 11/1993 | Nordstrom et al. | 707/8 |
| 5,295,262 | * 3/1994 | Seigh, II | 707/8 |
| 6,065,019 | * 5/2000 | Ault et al. | 707/206 |

OTHER PUBLICATIONS

Mendel, Brett; "Server I/O all set to flow"; *Lantimes*, Oct. 27, 1997, vol. 14, Issue 22; cover page and p. 31.

Briggs, Chris; "Smarter and Faster I/O for Servers"; CORE: Operating Systems; *Byte*, May 1, 1997, vol. 22, No. 5.

Thompson, Tom; "I₂O Beats I/O Bottlenecks"; *Byte*, Aug. 1997, pp. 85, 86 and 3 additional pages.

I₂O Introduction; Technology Backgrounder; Aug. 13, 1997; http://www.i2osig.org/Architecture/TechBack.html.

i960®RP I/O Processor—the I₂O SIG site; http://134.134.214.1/design/iio/i2osig.html; Feb. 6, 1998.

"Welcome to the I₂O SIG® Web Site?"; http://www.i2osig.org; Feb. 6, 1998.

"About I₂O Technology"; http://www.i2osig.org/Architecture; Feb. 6, 1998.

"Technology Backgrounder"; http://www.i2osig.org/Architecture/TechBack.html; Feb. 6, 1998; 6 pages.

"Questions and Answers"; http://www.i2osig.org/Architecture/QandA.html; Feb. 6, 1998; 4 pages.

"I₂O® Specifications For Non–Members"; http://www.i2osig.org/Architecture/GetSpec.html; Feb. 6, 1998.

Amdahl, Carlton G.; "I₂O Future Directions"; http://www.i2osig.org; Jun. 1996; 12 pages.

Goble, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

Listing of Press Releases ; http://altavista.digital.com/cig-–bin/quer . . . =21%2FMar%2F86&d1=&search.x=46&search.y=6; Feb. 6, 1998; 2 pages.

(List continued on next page.)

* cited by examiner

*Primary Examiner*—Thomas C. Lee
*Assistant Examiner*—Ilwoo Park
(74) *Attorney, Agent, or Firm*—Fletcher, Yoder & Van Someren (57) ABSTRACT

A method and apparatus for selectively incrementing a count number associated with a node which is subject to a compare and swap operation in a concurrent non-blocking queue. A memory stores data in a plurality of nodes residing in at least one queue. The plurality of nodes store both data and references to other nodes within the queue. An address of each node includes a pointer and a count number. A plurality of processors access the memory and operate on the plurality of nodes including performing a compare and swap operation. The count number of a node is selectively incremented only upon a successful compare and swap operation when the node is put in use by removing the node from an available source of free nodes and placing the node on the queue. Otherwise, the count number of the node is preserved.

9 Claims, 4 Drawing Sheets

OTHER PUBLICATIONS

Crothers, Brooke; "Intel server chip gets big backing", Oct. 7, 1997; http://www.news.com/News/Item/0,4,14962,00.html; Feb. 6, 1998.

"HP Demonstrates Commitment to $I_2O$ Standard With New I2O Disk–array Controller"; Hewlett Packard; Press Release, Atlanta, Oct. 8, 1997; http://hpcc920.external.hp.com/pressrel/oct97/08oct97b.html; Feb. 6, 1998; 2 pages.

"$I_2O$: Disaster in the making for the freeware community"; http://22.kenandted.com/i2o/disaster.html; Feb. 6, 1998; 2 pages.

Michael, Maged M. and Scott, Michael L.; "Simple, Fast, and Practical Non–Blocking and Blocking Concurrent Queue Algorithms"; 9 pages.

Michael, Maged M., and Scott, Michael L.; "Relative Performance of Preemption–Safe Locking and Non–Blocking Synchronization on Multiprogrammed Shared Memory Multiprocessors"; 7 pages.

Michael, Maged M. and Scott, Michael L.; "Non–Blocking Algorithms and Preemption–Safe Locking on Multiprogrammed Shared Memory Multiprocessors"; Mar. 1997; 35 pages.

Enqueue to Queue:

FIG. 2D

Dequeue from Queue:

SYSTEM FOR SELECTIVELY INCREMENTING A COUNT NUMBER OF AN ASSOCIATED NODE ONLY WHEN THE NODE IS PUT IN USE IN CONJUNCTION WITH A SUCCESSFUL COMPARE AND SWAP OPERATION

FIELD OF THE INVENTION

The present invention pertains in general to the implementation and control of concurrent non-blocking queues used in parallel software applications having a shared data structure, and more particularly, but not by way of limitation, to a method and apparatus for selectively incrementing count numbers associated with addresses of nodes used in concurrent non-blocking queues.

BACKGROUND OF THE INVENTION

Computer systems are increasingly incorporating multi-processing architectures which execute parallel software applications that share access to common data structures. Concurrent queues are used in multiprocessing computing environments. To insure "correctness," concurrent access to shared queues is synchronized. Traditional approaches to synchronizing access to critical regions have incorporated preemptive based spinlocks. These approaches are "blocking" and are not suitable for providing multiprocessor safe synchronization of critical regions between multiple threads of execution in user space (i.e. application software). The blocking characteristic of spinlock methods also reduces software scalability in situations of high contention in critical regions of a multiprocessor environment.

A set of concurrent non-blocking methods which demonstrate superior performance over traditional spinlock methods of multiprocessor synchronization have been developed by Maged M. Michael and Michael L. Scott. These methods allow multiple processors to gain concurrent non-blocking access to shared First In First Out (FIFO) queues with immunity from inopportune preemption and are especially useful for parallel software applications requiring shared access to FIFO queues. Furthermore, these methods demonstrate nearly linear scalability under high contention of critical regions in a multiprocessor environment and are incorporated directly in application software. These methods do not affect processor interrupts and do not require spinlock methods to provide mutual exclusion to a shared critical region. These methods are presented and described in greater detail in a publication authored by Maged M. Michael and Michael L. Scott, entitled "*Simple, Fast, and Practical Non-Blocking and Blocking Concurrent Queue Algorithms,*" published in the 15th ACM Symposium on Principles of Distributed Computing (PODC), May 1996.

Following is pseudo-code for implementing these methods as presented in the publication:

```
structure pointer_t {ptr: pointer to node_t, count: undersigned integer}
structure node_t        {value: data type, next pointer_t}
structure queue_t  {Head: pointer_t, Tail: pointer_t}
initialize(Q: pointer to queue_t)
        node=new_node()                                              # Allocate a free node
        node->next.ptr=NULL                                          # Make it the only node in the linked list
        Q->Head=Q->Tail=node                                         # Both Head and Tail point to it
enqueue(Q:pointer to queue_t, value: data type)
E1:     node=new_node()                                              # Allocate a new node from the free list
E2:     node->value=value                                            # Copy equenced value into node
E3:     node->next.ptr=NULL                                          # Set next pointer of node to NULL
E4:     loop                                                         # Keep trying until Enqueue is done
E5:         tail=Q->Tail                                             # Read Tail.ptr and Tail.count together
E6:         next=tail.ptr->next                                      # Read next ptr and count fields together
E7:         if tail ==Q->Tail                                        # Are tail and next consistent?
E8:             if next.ptr==NULL                                    # Was Tail pointing to the last node?
E9:                 if CAS(&tail.ptr->next, next, <node, next.count+1>)# Try to link node at the end of the linked list
E10:                    break                                        # Enqueue is done. Exit loop
E11:                endif
E12:            else                                                 # Tail was not pointing to the last node
E13:                CAS(&Q->Tail, tail, <next.ptr, tail.count+1>) # Try to swing Tail to the next node
E14:            endif
E15:        endif
E16:    endloop
E17:    CAS(&Q->Tail, tail, <node, tail.count+1)            # Enqueue is done. Try to swing to the
                                                             inserted node
dequeue(Q: pointer to queue_t, pvalue: pointer to data type): boolean
D1:     loop                                                 # Keep trying until Dequeue is done
D2:         head=Q->Head                                     # Read Head
D3:         tail=Q->Tail                                     # Read Tail
D4:         next=head->next                                  # Read Head.ptr->next
D5:         if head == Q->Head                               # Are head, tail, and next consistent?
D6:             if head.ptr==tail.ptr                        # Is queue empty or Tail falling behind?
D7:                 if next.ptr==NULL                        # Is queue empty?
D8:                     return FALSE                         # Queue is empty, couldn't dequeue
D9:                 endif
D10:                CAS(&Q->Tail, tail, <next.ptr, tail.count+1>)    # Tail is falling behind. Try to advance it
D11:            else                                         # No need to deal with Tail
                    # Read value before CAS, otherwise another dequeue might free the next node
D12:                *pvalue=next.ptr->value
D13:                if CAS(&Q->Head, head, <next.ptr, head.count+1>)     # Try to swing Head to the next node
D14:                    break                                # Dequeue is done. Exit loop
```

-continued

```
D15:                    endif
D16:              endif
D17:        endif
D18: endloop
D19: free(head.ptr)                          # It is safe now to free the old dummy node
D20: return TRUE                             # Queue was not empty, dequeue succeeded
```

One shortcomings of these queuing methods, however, involves a condition referred to as an "ABA" condition. The "ABA" condition occurs on computing platforms, such as the Intel 486 and the Pentium class lines of processors, which utilize a Compare-And-Swap (CAS) atomic primitive. The "ABA" condition occurs when a process reads a value "A" from a shared memory location, computes a new value and then attempts the CAS operation. In certain circumstances, the CAS operation may succeed when it should have failed. Such a situation arises when, between the memory read and the CAS operation, some other process or processes change the value "A" to value "B" and then back to value "A." Although the CAS operation succeeds since the value of the shared memory location has returned to value "A," the value in the memory location to which "A" points may have changed. To reduce the probability of encountering the "ABA" condition, the aforementioned queuing methods implement a sequence or count number as part of node address associated with the shared memory location. The count number is incremented with every successful CAS operation so that a determination can be made as to whether the contents of the shared memory location has been altered. While the use of count numbers reduces the probability of encountering the "ABA" condition, the method falls short on the previously mentioned Intel processors due to the frequent incrementing of the count number which causes the count to wrap around and possibly end up at the original count number. The probability of a wrap around condition occurring is especially likely in high contention situations and increases as the speed of the processor increases and the total number of nodes in the queue decreases.

It would be advantageous therefore, to devise a method and apparatus which selectively increments count numbers associated with nodes in a queue to reduce the number of times the count numbers are incremented. Such a method and apparatus would increase the time between the occurrence of wrap around conditions and thereby, reduce the likelihood of encountering an "ABA" condition.

SUMMARY OF THE INVENTION

The present invention comprises a method and apparatus for selectively incrementing a count number associated with a node which is subject to a compare and swap operation in a concurrent non-blocking queue. A memory stores data in a plurality of nodes residing in at least one queue. The plurality of nodes store both data and references to other nodes within the queue. An address of each node includes a pointer and a count number. A plurality of processors access the memory and operate on the plurality of nodes including performing a compare and swap operation. The count number of a node is selectively incremented only upon a successful compare and swap operation when the node is put in use by removing the node from an available source of free nodes and placing the node on the queue. Otherwise, the count number of the node is preserved.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

The present invention hereby incorporates by reference a publication authored by Maged M. Michael and Michael L. Scott, entitled "*Simple, Fast, and Practical Non-Blocking and Blocking Concurrent Queue Algorithms*," published in the 15th ACM Symposium on Principles of Distributed Computing (PODC), May 1996.

Instead of viewing the "ABA" condition as attributable to a change in any memory cell resulting from a CAS operation as the current methods do, the present invention views the condition as resulting from an explicit reuse of a node. Therefore, the present invention tracks node reuse instead of memory cell reuse. The present invention increments the count number once per node only when the node is removed from a free list and placed on a FIFO list. In a first embodiment of the present invention, the count number is incremented when the node is removed from the free list. In an alternative embodiment of the present invention, the count number is incremented when the node is placed on the FIFO list. Therefore, while the current methods indiscriminately increment the count number in conjunction with each successful CAS operation, the present invention increments the count number only when the node is reused.

Figure 1:
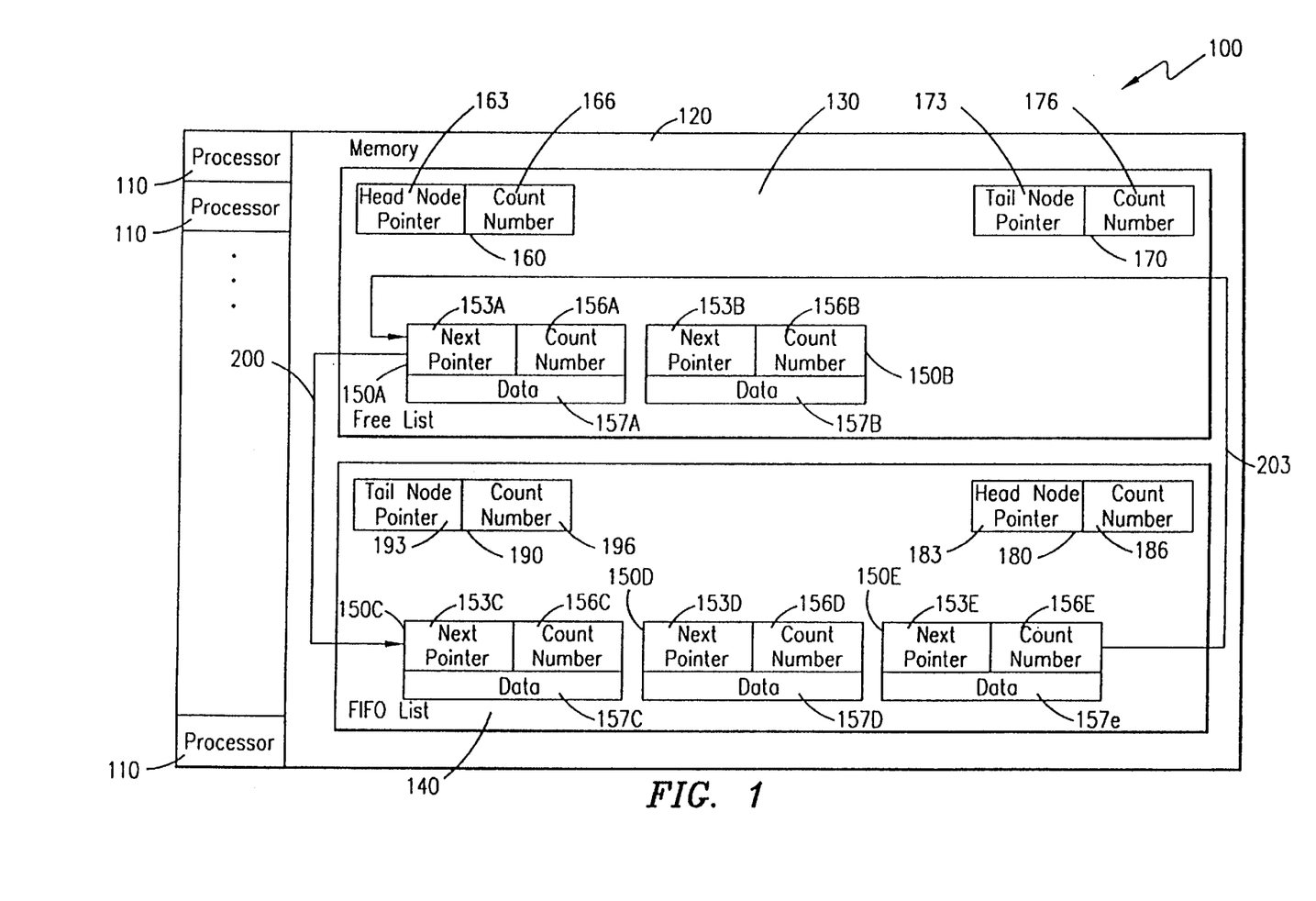
FIG. 1 is a functional block diagram of a computer system for incrementing count numbers associated with addresses of nodes used in concurrent non-blocking queues and depicts the movement of nodes from a free list queue to a FIFO list queue and back to the free list queue.

Referring now to FIG. 1, there is illustrated a functional block diagram of a computer system for incrementing count numbers associated with addresses of nodes used in concurrent non-blocking queues and depicts the movement of nodes from a free list queue to a FIFO list queue and back to the free list queue. A computer system shown generally at 100 comprises a plurality of processors 110, which execute parallel software applications, and a shared memory 120 accessible by the plurality of processors 110. The memory 120 is partitioned to include at least a free list 130 and a FIFO list 140. The free list 130 and the FIFO list 140 comprise a plurality of nodes 150A–E. Each node 150A–E is a memory packet used to hold both data and a reference to the next node in a list of nodes. The free list 130 is a Last in First Out (LIFO) based concurrent non-blocking stack used to hold free nodes available to queue data onto the FIFO list 140. The FIFO list is a First In First Out based concurrent non-blocking queue used to hold nodes containing data. Both the free list 130 and the FIFO list 140 contain an extra node, referred to as a dummy node, which prevents head pointers and tail pointers associated with the free list 130 and the FIFO list 140 from assuming a null value. The plurality of nodes 150A–E include an associated plurality of pointers 153A–E, an associated plurality of count numbers 156A–E and an associated plurality of data storage locations 157A–E. The pointer 153 and the count number 156 of a given node 150 together form a node address for a next node in a list of nodes with the pointer 153 pointing to the next node and the count number 156 indicative of the reuse of the next node.

In FIG. 1, nodes 150A–B are shown as residing in the free list 130 while nodes 150C–E are shown as residing in the FIFO list 140. The free list 130 further comprises a free list head pointer 160 and a free list tail pointer 170. Similarly, the FIFO list 140 further comprises a FIFO list head pointer 180 and a FIFO list tail pointer 190. The free list head pointer 160 and the FIFO list head pointer 180 represent tops of the respective lists and point to the first node on the respective lists. The free list tail pointer 170 and the FIFO list tail pointer 190 represent bottoms of the respective lists and point to the last node on the respective lists.

Nodes 150A–B in the free list 130 are organized as a Last In First Out (LIFO) queue also referred to as a stack with the nodes 150A–B relating to one another in a single linked list using the node addresses comprised of the associated pointers 153A–B and count numbers 156A–B. Node 150A is at the top of the stack and is, therefore, referred to as the free list head while node 150B is at the bottom of the stack and is, therefore, referred to as the free list tail. The pointer 153A of node 150A points to the next node in the free list 130, in this example node 150B, while the pointer 153B of node 150B points to null since node 150B is the tail of the free list 130. In this instance, the queue is a LIFO queue and therefore, the free list tail, node 150B is the dummy node for the free list 130. Although FIG. 1, depicts the free list 130 as including two nodes, 150A–B, it is understood that the free list 130 can include any number of nodes and needs only to contain the one dummy node.

Nodes 150C–E in the FIFO list 140 are organized as a First In First Out (FIFO) queue with the nodes 150C–E relating to one another in a single linked list using the node addresses comprised of the associated pointers 153C–E and count numbers 156C–E. Node 150E is at the beginning of the FIFO list 140 and is, therefore, referred to as the FIFO list head while node 150C is at the end of the FIFO list 140 and is, therefore, referred to as a FIFO list tail. The pointer 153E of node 150E points to the next node in the FIFO list 140, node 150D, while the pointer 153D of node 150D points to the following node in the FIFO list 140, node 150C. The pointer 153C of node 150C points to null since node 150C is the tail of the FIFO list 140. Nodes 150C–D have been placed on the FIFO list 140 and, therefore, contain data in the respective data storage locations 157C–D. In this instance, the queue is a FIFO queue and therefore, the FIFO list head, node 150E, is the dummy node and contains no data in its data storage location 157E. Although FIG. 1, depicts the FIFO list 140 as including three nodes 150C–E, it is understood that the FIFO list 140 can include any number of nodes and needs only to contain the one dummy node.

The free list head pointer 160 contains the node address for the free list head, node 150A, and is comprised of a head node pointer 163, which points to the free list head, node 150A, and an associated count number 166. Likewise, the free list tail pointer 170 contains the node address for the free list tail, node 150B, and is comprised of a tail node pointer 173, which points to the free list tail, node 150B, and an associated count number 176.

The FIFO list head pointer 180 contains the node address for the FIFO list head, node 150E, and is comprised of a head node pointer 183, which points to the FIFO list head, node 150E, and an associated count number 186. Likewise, the FIFO list tail pointer 190 contains the node address for the FIFO list tail, node 150C, and is comprised of a tail node pointer 193, which points to the FIFO list tail, node 150C, and an associated count number 196.

A node address for a given node contains a pointer and a count number. Furthermore, the node address for the node does not reside in the pointer and count number forming the memory packet which constitutes the node. Instead, the node address for the node is found in the pointer and count number of other nodes which point to the given node. For example, the node address formed by the pointer 153D and 156D of node 150D is not the node address of node 150D but rather, is the node address of node 150C, the node to which node 150D points.

When node 150A is removed from the free list 130 to be placed on the FIFO list 140 as shown by path 200, the count number contained in the node address of node 150A is incremented. In accordance with the present invention, this is the only situation in which the count number is incremented. In a first embodiment of the present invention the count number is incremented when the node at the top of the free list 130 is dequeued from the free list 130. In an alternative embodiment, the count number is incremented when the node at the top of the free list 130 is enqueued to the FIFO list 140. In addition to incrementing the count number, data is stored in the data storage location 157A of node 150A when node 150A is dequeued from the free list 130 and node 150A is enqueued to the FIFO list 140. Since node 150A is no longer the free list head and node 150C is no longer the FIFO list tail, several node address changes occur.

The node address contained in the FIFO list tail pointer 190 and the node address contained in node 150C are modified to point to node 150A. The node address for node 150A is obtained from the free list head pointer 160 with the count number being incremented since the free list head, node 150A, is being dequeued from the free list 130 and enqueued to the FIFO list 140 in accordance with the present invention. The node address contained in the free list head pointer 160 is modified to point to node 150B, the new free list head. The node address for node 150B is obtained from node 150A which previously pointed to node 150B. The node address contained in node 150A is modified to point to null since node 150A is the new FIFO list tail.

When node 150E is removed from the FIFO list 140 and placed on the free list 130 as shown by path 203, the node address of 150E is not incremented in accordance with the present invention. Since node 150E is no longer the FIFO list head and node 150B is no longer the free list head, several node address changes occur. The node address contained in the FIFO list head pointer 180 is modified to point to node 150D. The node address for node 150D is obtained from node 150E. The node address contained in node 150E is modified to point to node 150B. The node address for node 150B is obtained from the free list head pointer 160. The node address contained in the free list head pointer 160 is modified to point to node 150E. The node address for node 150E can be obtained from the previous node address contained in the FIFO list head pointer 180. The previous node address contained in the FIFO list head pointer 180 can be temporarily stored in any manner, for example, temporarily storing the value in one of the processors 110.

Figure 2A:
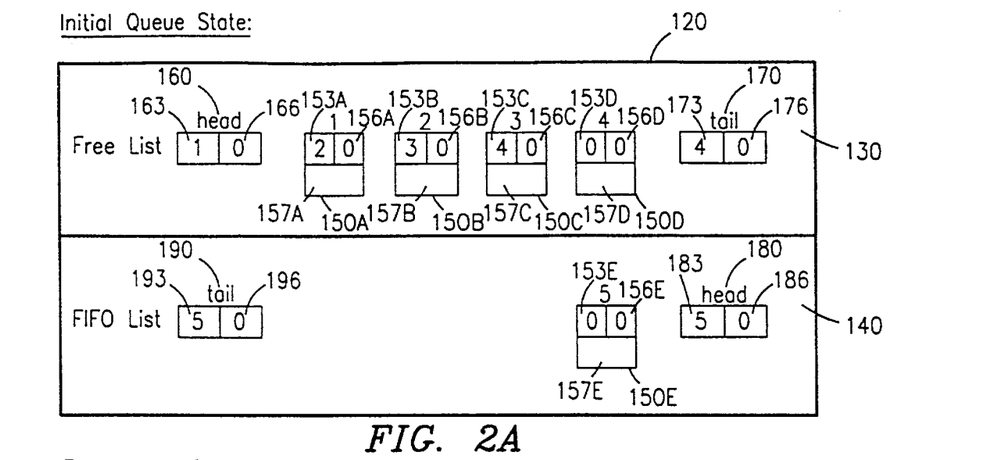
FIG. 2A is a block diagram of the free list queue and the FIFO list queue including a pointer and count number associated with each node in the queues at an initial queue state.

Referring additionally now to FIG. 2A, there is illustrated a block diagram of the free list queue 130 and the FIFO list queue 140 including a pointer and count number associated with each node in the queues at an initial queue state. In addition to the components and functionality described in FIG. 1, FIGS. 2A–E further include reference numbers 1–5 associated with nodes 150A–E corresponding to locations or addresses of the nodes 150A–E in the memory 120. The reference numbers 1–5 are used in the examples as the pointer values. Although FIGS. 2A–E depict the values of the pointers used in the free list 130 and the FIFO list 140, for purposes of clarity, a description of the transitions in their values is not provided. It is understood that the methods in which the transitions in the values of the pointers occur is well known and is described in FIG. 1, as well as in the publication incorporated by reference.

In the initial queue state, the free list 130 contains four nodes, nodes 150A–D including dummy node 150D and the FIFO list 140 contains a single dummy node, node 150E. Each of the count numbers 156A–E, 166, 176, 186 and 196 are set to a certain initial value which, in this example, is the value zero.

Figure 2B:
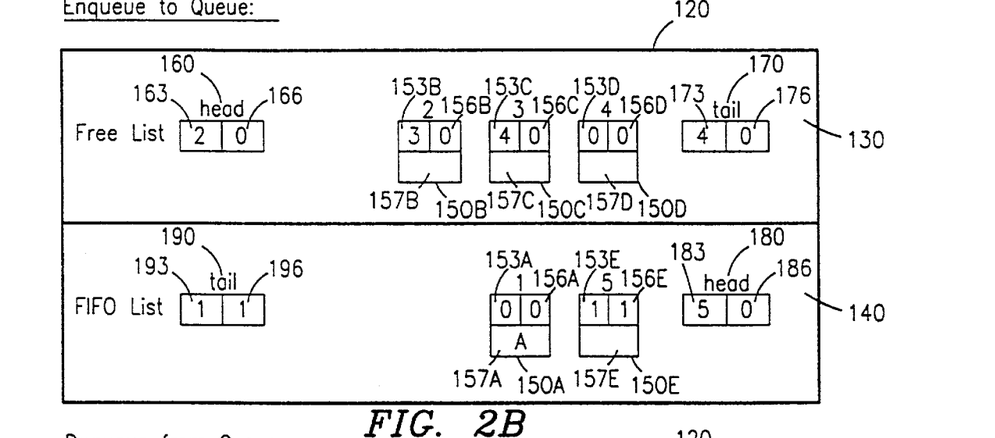
FIG. 2B is a block diagram of the free list queue and the FIFO list queue including the pointer and count number associated with each node in the queues following the enqueuing of a first item to the FIFO queue.

Referring additionally now to FIG. 2B, there is illustrated a block diagram of the free list queue 130 and the FIFO list queue 140 including the pointer and count number associated with each node in the queues following the enqueuing of a first item to the FIFO queue 140. When the head node of the free list 130, node 150A, is removed from the free list 130 and placed on the FIFO list 140 due to the enqueuing of the first item (A), the count number contained in the node address of node 150A is incremented. As is shown in FIG. 2B, the count number 156A is not incremented since it is not part of the node address of node 150A. Instead, the count numbers, 156E and 196 of node 150E and FIFO list tail pointer 190 reflect the incrementing since they contain the node address which point to node 150A. In accordance with the present invention, this is the only situation in which count numbers of a node are incremented.

Figure 2C:
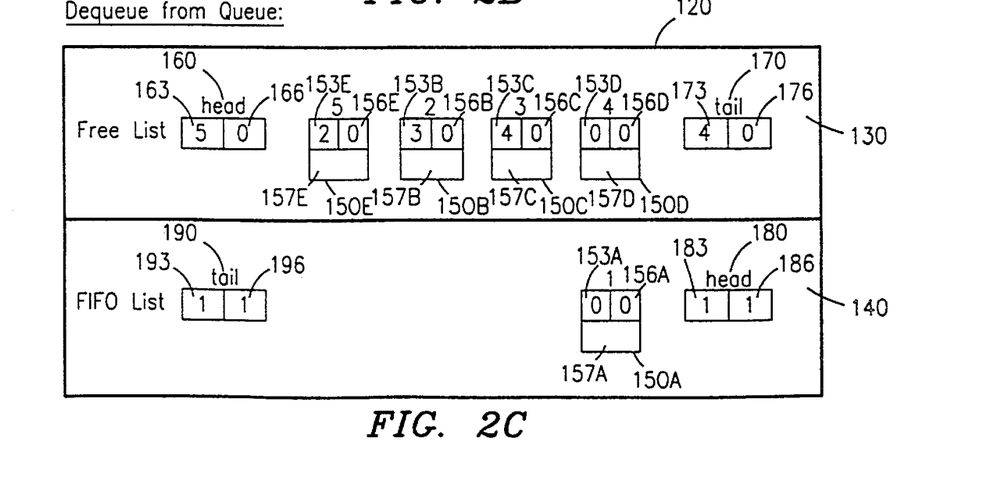
FIG. 2C is a block diagram of the free list queue and the FIFO list queue including the pointer and count number associated with each node in the queues following the dequeueing of the first item from the FIFO queue.

Referring additionally now to FIG. 2C, there is illustrated a block diagram of the free list queue 130 and the FIFO list queue 140 including the pointer and count number associated with each node in the queues following the dequeueing of the first item from the FIFO queue 140. When the node at the head of the FIFO list 140, node 150E, is removed from the FIFO list 140 and placed on the free list 130 due to the dequeueing of the first item (A), no count number is incremented. Node 150E is removed from the FIFO list 140 and placed on the free list 130 and the first data item (A) is removed from node 150A.

Figure 2D:
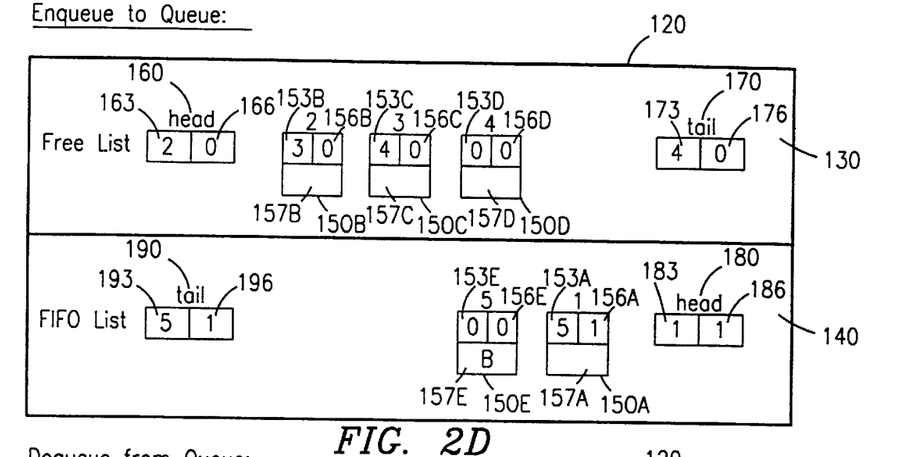
FIG. 2D is a block diagram of the free list queue and the FIFO list queue including the pointer and count number associated with each node in the queues following the enqueuing of a second item to the FIFO queue.

Referring additionally now to FIG. 2D, there is illustrated a block diagram of the free list queue 130 and the FIFO list queue 140 including the pointer and count number associated with each node in the queues following the enqueuing of a second item to the FIFO queue 140. When a node at the head of the free list 130, node 150E, is removed from the free list 130 and placed on the FIFO list 140 due to the enqueuing of a second item (B), the count number contained in the node address of node 150E is incremented. As is shown in FIG. 2B, the count number 156E is not incremented since it is not part of the node address of node 150E. Instead, the count number, 156A and 196 of the node 150A and FIFO list tail pointer 190 are incremented since they form part of the node addresses which point to node 150E. In accordance with the present invention, this is the only situation in which count numbers of a node are incremented.

Figure 2E:
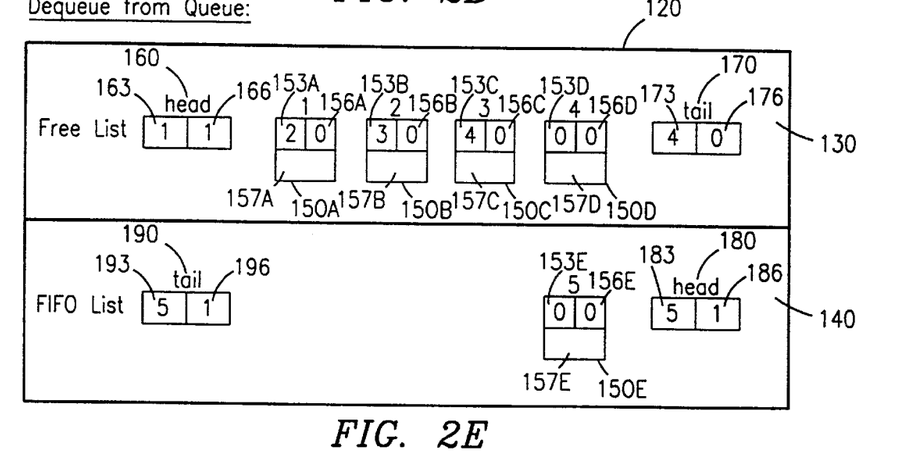
FIG. 2E is a block diagram of the free list queue and the FIFO list queue including the pointer and count number associated with each node in the queues following the dequeueing of the second item from the FIFO queue.

Referring additionally now to FIG. 2E, there is illustrated a block diagram of the free list queue 130 and the FIFO list queue 140 including the pointer and count number associated with each node in the queues following the dequeueing of the second item from the FIFO queue 140. When the node at the head of the FIFO list 140, node 150A, is removed from the FIFO list 140 and placed on the free list 130 due to the dequeueing of the second item (B), no count number is incremented. Node 150A is removed from the FIFO list 140 and placed on the free list 130 and the second data item (B) is removed from node 150E.

Figure 3:
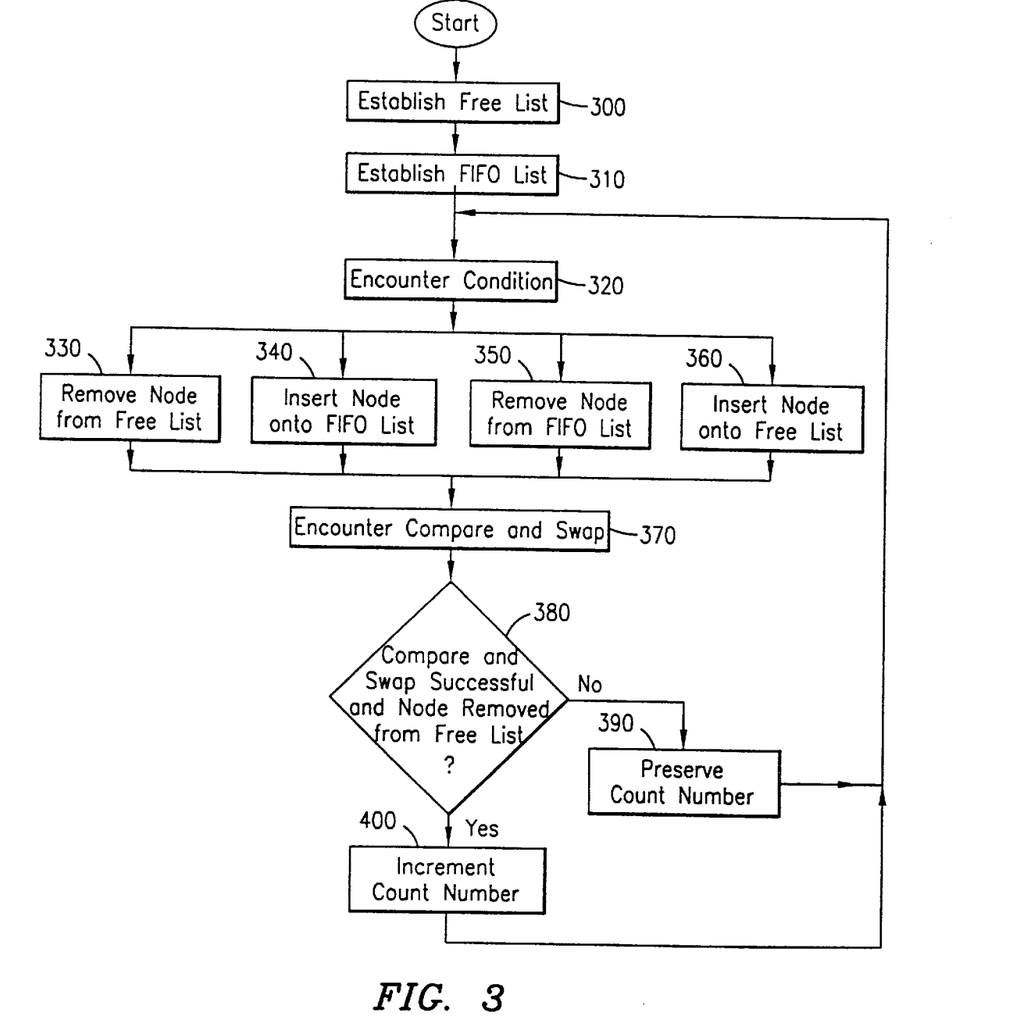
FIG. 3 is a flow diagram of a method for incrementing count numbers associated with addresses of nodes used in concurrent non-blocking queues consistent with the preferred embodiment described in FIG. 1.

Referring additionally now to FIG. 3, there is illustrated a flow diagram of a method for incrementing count numbers 156A–E associated with nodes 150A–E in concurrent non-blocking queues consistent with the preferred embodiment described in FIG. 1. The computer system 100 establishes a free list 130 (step 300) and establishes a FIFO list 140 (step 310). During the operation of the processors 110, a condition is encountered which requires a node, from the plurality of nodes 150A–E, to be inserted onto or removed from either the free list 130 or the FIFO list 140 (step 320). In accordance with the encountered condition, the node is either removed from the free list 130 (step 330), inserted onto the FIFO list 140 (step 340), removed from the FIFO list 140 (step 350) or inserted onto the free list 130 (step 360) and a compare and swap operation is encountered (step 370). A determination is made as to whether the compare and swap operation was successful and whether the node which was the subject of the compare and swap operation was removed from the free list 130 (step 380). If the compare and swap operation was unsuccessful or if the node which was the subject of the compare and swap operation was not removed from the free list 130, the count number of the node is preserved (step 390). If, on the other hand, the compare and swap operation was successful and the node which was the subject of the compare and swap operation was removed from the free list 130, the count number of the node is incremented (step 400).

In an alternative embodiment, in step 380 a determination is made as to whether the compare and swap operation was successful and whether the node which was the subject of the compare and swap operation was placed on the FIFO list 140. If the compare and swap operation was unsuccessful or if the node which was the subject of the compare and swap operation was not placed on the FIFO list 140, the count number of the node is preserved in step 390. Otherwise, if the compare and swap operation was successful and the node which was the subject of the compare and swap operation was placed on the FIFO list 140, the count number of the node is incremented in step 400.

The following pseudo-code is provided as an example of one way in which the method described in FIG. 2, may be implemented.

```
ENQUEUE (Q: pointer to QUEUE, Data):BOOLEAN
E1:     if NEWNODE (Q, &node) == TRUE
E2:         node.ptr->data=Data
E3:         node.ptr->next.ptr = NULL // this could also be node.ptr->next = NULL
E4:         loop
E5:             tail = Q->fifolist->tail
E6:             next = tailnode.ptr->next
E7:             if tail == Q->fifolist->tail
E8:                 if next.ptr == NULL
E9:                     if CAS (&tail.ptr->next, next, node) == TRUE
E10:                        break
E11:                    endif
E12:                else
E13:                    CAS (&Q->fifolist->tail, tail, next)
E14:                endif
E15:            endif
E16:        endloop
E17:        CAS (&Q->fifolist->tail, tail, node)
E18:        return TRUE
E19:    else
E20:        return FALSE
E21:    endif
DEQUEUE (Q: pointer to QUEUE,pData):BOOLEAN
D1:     loop
D2:         head = Q->fifolist->head
D3:         tail = Q->fifolist->tail
D4:         next = head.ptr->next
D5:         if head == Q->fifolist->head
D6:             if head.ptr == tail.ptr
D7:                 if next.ptr == NULL
D8:                     return FALSE
D9:                 endif
D10:                CAS (&Q->fifolist->tail, tail, next)
D11:            else
D12:                *pData = next.ptr->data
D13:                if CAS (&Q->fifolist->head, head, next) == TRUE
D14:                    break
D15:                endif
D16:            endif
D17:        endif
D18:    endloop
D19:    FREENODE (Q, head)
D20:    return TRUE
NEWNODE(Q: pointer to QUEUE, pNode: pointer to NODE):BOOLEAN
N1:     loop
N2:         head = Q->freelist->head
N3:         next = head.ptr->next
N4:         if head == Q->freelist->head
N5:             if next.ptr == NULL
N6:                 return FALSE
N7:             endif
N8:             if CAS (&Q->freelist->head, head, next) == TRUE
N9:                 *pNode = [head.ptr,head.count+1]
N10:                return TRUE
N11:            endif
N12:        endif
N13:    endloop
FREENODE (Q: pointer to QUEUE, Node: NODE)
F1:     loop
F2:         head = Q->freelist->head
F3:         node.ptr->next = head
F4:         if CAS (&Q->freelist->head,head,Node) == TRUE
F5:             return
F6:         endif
F7:     endloop
```

As has been described, the count number 153A–E, for any given node in the plurality of nodes 150A–E, is incremented only once during a cycle of removing the node from the free list 130, inserting the node on the FIFO list 140, removing the node from the FIFO list 140 and inserting the node on the free list 130. This is in contrast to incrementing the count number 153 on every successful compare and swap operation as has previously been done. Reducing the number of times the count number 153 is incremented reduces the number of times the count number 153 wraps around and, therefore, reduces the probability that the "ABA" condition is encountered.

The present invention has been described as being preformed using a single read operation to read data from memory locations, for example preforming a thirty-two bit compare and swap operation on a processor capable of performing a thirty-two bit read operation. It is understood, however, that the present invention is equally applicable to situations where two or more read operations are required to read a memory location such as on a processor which requires two thirty-two bit read operations to read a sixty-four bit memory location which is the subject of a sixty-four bit compare and swap operation.

Although the preferred embodiments of the present invention have been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims. For example, while the Detailed Description and accompanying Drawings describe the memory as partitioned into a free list and a FIFO list, the memory can further be partitioned into other data structures which employ the method and apparatus of the present invention.

What is claimed is:

1. A computer system comprising:
   a memory for storing data;
   a plurality of nodes residing within the memory for storing both data and references to other nodes within the computer system;
   a plurality of pointers, each pointer associated with a respective node from the plurality of nodes;
   a plurality of count numbers, each count number associated with a respective node from the plurality of nodes; and
   a plurality of processors, the processors having access to the memory for operating on the plurality of nodes, the processors further for performing a compare and swap operation on the plurality of nodes and selectively incrementing the count number of an associated node only when the node is put in use in conjunction with a successful outcome to the compare and swap operation.

2. The computer system as recited in claim 1, wherein the memory comprises:
   a first data structure for storing a list of free nodes currently available to the computer system;
   a second data structure for queuing nodes which are currently storing data for use by the computer system; and
   wherein the plurality of processors increment the count number of an associated node when the node is put in use through insertion of the node onto the second data structure in conjunction with a successful outcome to the compare and swap operation.

3. The computer system as recited in claim 1, wherein the memory comprises:
   a first data structure for storing a list of free nodes currently available to the computer system;
   a second data structure for queuing nodes which are currently storing data for use by the computer system; and
   wherein the plurality of processors increment the count number of an associated node when the node is put in use through removal of the node from the first data structure in conjunction with a successful outcome to the compare and swap operation.

4. A method for selectively incrementing a count number associated with a node which is subject to a compare and swap operation in a concurrent non-blocking queue comprising the steps of:
   performing a control operation for controlling operation of a queue;
   encountering a compare and swap operation in performing the control operation;
   determining whether the node which is subject to the compare and swap operation is being put in use through insertion of the node onto the queue;
   incrementing an associated count number of the node if it is determined that the node is being put to use through insertion of the node onto the queue in conjunction with a successful outcome to the compare and swap operation; otherwise
   preserving a current value of the count number associated with the node.

5. A method for selectively incrementing a count number associated with a node which is subject to a compare and swap operation in a concurrent non-blocking queue comprising the steps of:
   performing a control operation for controlling operation of a queue;
   encountering a compare and swap operation in performing the control operation;
   determining whether the node which is subject to the compare and swap operation is being put in use through removal of the node from the queue;
   incrementing an associated count number of the node if it is determined that the node is being put to use through removal of the node from the queue in conjunction with a successful outcome to the compare and swap operation; otherwise
   preserving a current value of the count number associated with the node.

6. A method for selectively incrementing count numbers associated with a plurality of nodes using a compare and swap operation in a concurrent non-blocking queue comprising the steps of:
   establishing at least one queue;
   encountering a condition requiring a node to be inserted onto or removed from the queue;
   initiate an enqueue operation if the node is to be inserted onto the queue;
   initiate a dequeue operation if the node is to be removed from the queue;
   encountering a compare and swap operation;
   determining whether the node which is subject to the compare and swap operation is being inserted onto the queue;
   incrementing an associated count number of the node if it is determined that the node is being inserted onto the queue in conjunction with a successful outcome to the compare and swap operation; otherwise
   preserving a current value of the count number associated with the node.

7. A method for selectively incrementing count numbers associated with a plurality of nodes using a compare and swap operation in a concurrent non-blocking queue comprising the steps of:
   establishing at least one queue;

encountering a condition requiring a node to be inserted onto or removed from the queue;

initiate an enqueue operation if the node is to be inserted onto the queue;

initiate a dequeue operation if the node is to be removed from the queue;

encountering a compare and swap operation;

determining whether the node which is subject to the compare and swap operation is being removed from the queue;

incrementing an associated count number of the node if it is determined that the node is being removed from the queue in conjunction with a successful outcome to the compare and swap operation; otherwise preserving a current value of the count number associated with the node.

8. A method for selectively incrementing count numbers associated with a plurality of nodes using a compare and swap operation in a concurrent non-blocking queue comprising the steps of:

establishing a free list queue, establishing a FIFO list queue;

encountering a condition requiring a node to be inserted onto or removed from the free list queue or the FIFO list queue;

removing the node from the free list queue if the encountered condition requires the node to be removed from the free list queue;

inserting the node onto the FIFO list queue if the encountered condition requires the node to be inserted onto the FIFO list queue;

removing the node from the FIFO list queue if the encountered condition requires the node to be removed from the FIFO list queue;

inserting the node onto the free list queue if the encountered condition requires the node to be inserted onto the free list queue;

encountering a compare and swap operation;

determining whether the node which is subject to the compare and swap operation is being inserted onto the FIFO queue in conjunction with a successful outcome to the compare and swap operation;

incrementing an associated count number of the node if it is determined that the node is being inserted onto the FIFO queue in conjunction with a successful outcome to the compare and swap operation; otherwise preserving a current value of the count number.

9. A method for selectively incrementing count numbers associated with a plurality of nodes using a compare and swap operation in a concurrent non-blocking queue comprising the steps of:

establishing a free list queue;

establishing a FIFO list queue;

encountering a condition requiring a node to be inserted onto or removed from the free list queue or the FIFO list queue;

removing the node from the free list queue if the encountered condition requires the node to be removed from the free list queue;

inserting the node onto the FIFO list queue if the encountered condition requires the node to be inserted onto the FIFO list queue;

removing the node from the FIFO list queue if the encountered condition requires the node to be removed from the FIFO list queue;

inserting the node onto the free list queue if the encountered condition requires the node to be inserted onto the free list queue;

encountering a compare and swap operation;

determining whether the node which is subject to the compare and swap operation is being removed from the free list queue in conjunction with a successful outcome to the compare and swap operation;

incrementing an associated count number of the node if it is determined that the node is being removed from the free list queue in conjunction with a successful outcome to the compare and swap operation; otherwise preserving a current value of the count number.

* * * * *